UNITED STATES PATENT OFFICE.

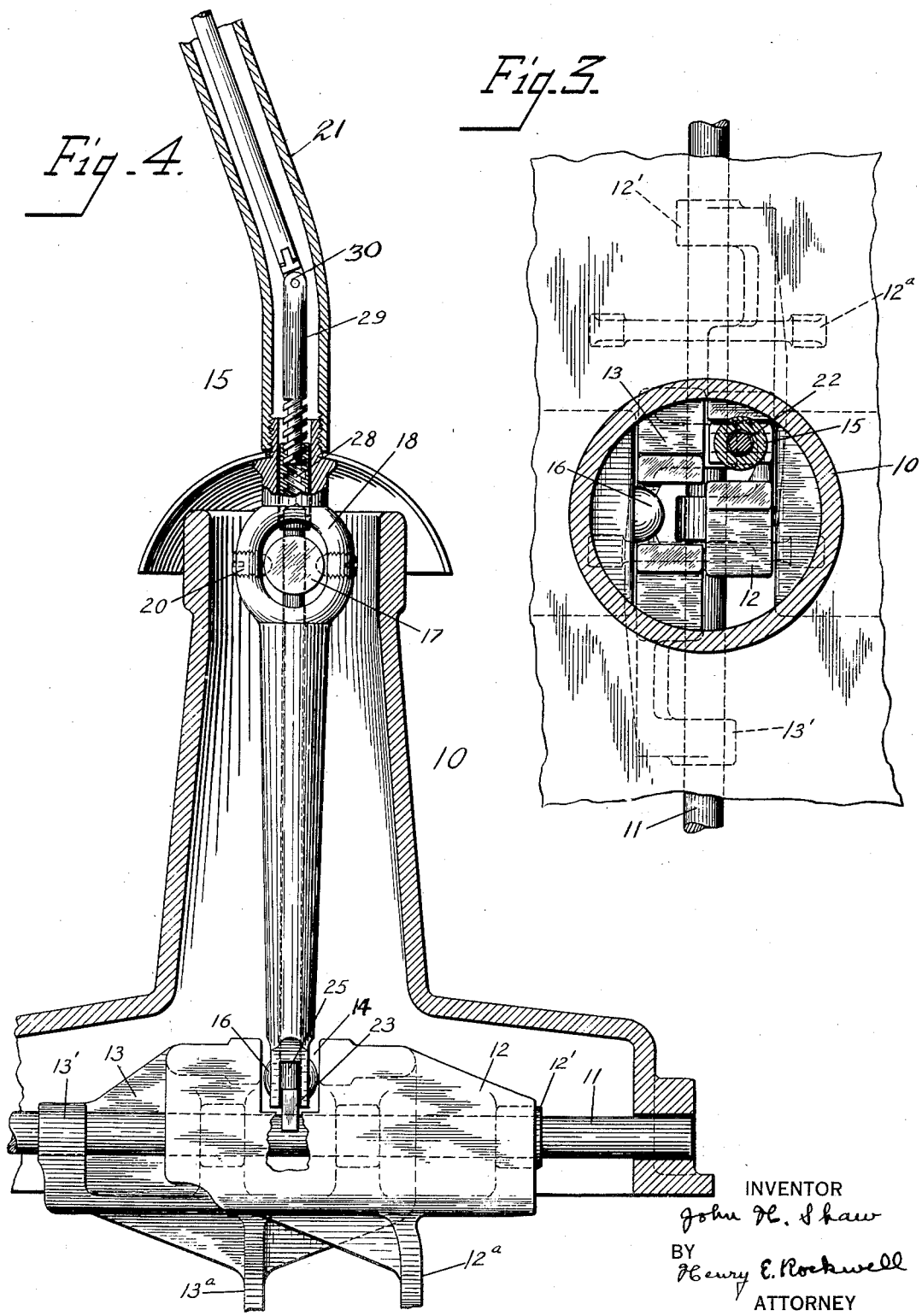

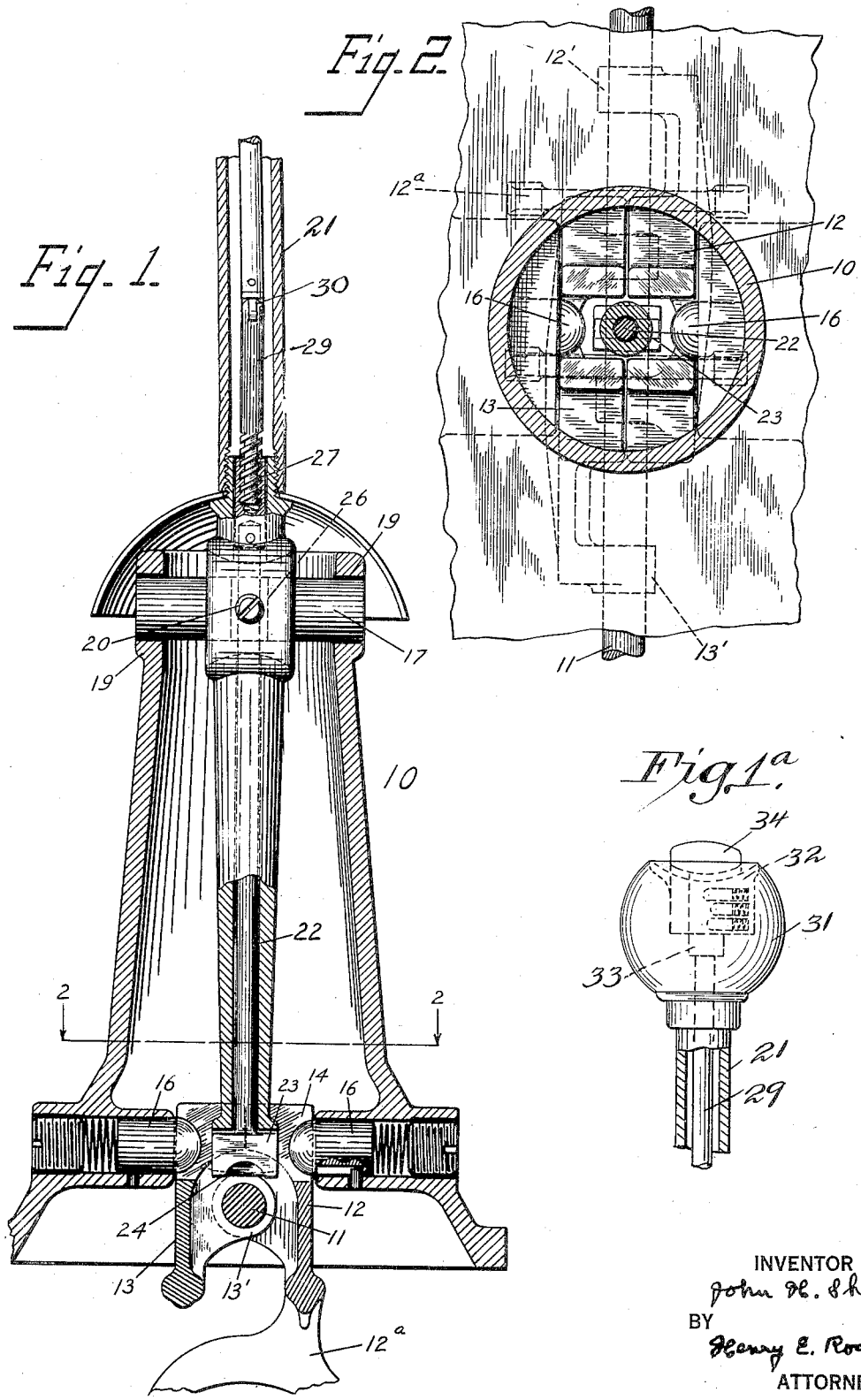

JOHN H. SHAW, OF NEW HAVEN, CONNECTICUT, ASSIGNOR TO SARGENT & COMPANY, OF NEW HAVEN, CONNECTICUT, A CORPORATION OF CONNECTICUT.

LOCK FOR GEAR-SHIFT LEVERS.

1,374,169. Specification of Letters Patent. Patented Apr. 5, 1921.

Application filed December 19, 1919. Serial No. 345,936.

*To all whom it may concern:*

Be it known that I, JOHN H. SHAW, of New Haven, county of New Haven, State of Connecticut, have invented certain new and useful Improvements in Locks for Gear-Shift Levers, of which the following is a full, clear, and exact description.

This invention relates to locks and more particularly to locking mechanism for preventing the unauthorized manipulation of a gear shift lever.

The primary object of my invention is to provide the type of gear shifting mechanism which consists of a casing having a guide therein upon which the gear shifting slides are mounted, with locking means for locking the gear shift lever in its neutral position by securing the lower end of the same to this guide.

Another oject of my invention is to provide the type of gear shift lever which is pivotally mounted upon trunnions extending at right angles to each other, with lock operating means extending longitudinally within said lever and passing between said trunnions.

To these and other ends the invention consists in the novel features and combinations of parts to be hereinafter described and claimed.

In the accompanying drawings:

Figure 1 is a vertical sectional view through a gear shift lever and supporting bracket embodying my invention, the lever being shown in its neutral position but unlocked in this position.

Fig. 1$^A$ is a detail view of the upper end of the gear shift lever showing the mounting of the lock therein.

Fig. 2 is a sectional view taken on the line 2—2 of Fig. 1 looking in the direction of the arrows showing the lever controlled slides in their neutral position.

Fig. 3 is a sectional view similar to Fig. 2, but showing one of the lever controlled slides moved out of its neutral position; and Fig. 4 is a vertical sectional view through the lever casing showing the lever locked in its neutral position, this sectional view being taken at right angles to the section shown in Fig. 1.

Since my locking mechanism is designed to coöperate with the support for the sliding elements operated by the gear shift lever, I have deemed it advisable to show and briefly describe these lever operated elements. In the drawings, I have indicated by the numeral 10 a gear shift lever casing in the lower portion of which is mounted a relatively long, horizontally extending rod 11, and upon this rod is slidably mounted a pair of gear positioning slides 12 and 13. Each of these gear positioning slides is provided with a slot 14 formed in the upper face thereof adapted to receive the lower end of the gear shift lever 15. These slides 12 and 13 are constructed so that one slide lies almost entirely to one side of a vertical plane extending longitudinally of the rod 11, while the other slide lies almost entirely upon the opposite side of this plane, the arrangement being such that either slide may be moved back and forth upon its guide rod 11 without disturbing the other slide. The slide 12 has formed adjacent each end thereof a ring or sleeve 12' which slidably receives the guide rod 11, and the slide 13 is likewise provided with a sleeve 13' adjacent each of its ends. These slides are provided with the downwardly projecting portions 12$^a$ and 13$^a$ adapted to operatively engage the transmission gears (not shown). The slides 12 and 13 are normally retained in the position shown in Figs. 1, 2 and 4 (which I term the neutral position) by spring-operated pins 16. These pins are constructed to project into the slots 14 formed in the slides 12 and 13 to retain the same in their neutral position, so that these slides cannot be shifted out of this position until the gear shift lever 15 has first been moved laterally sufficiently to force one of the pins 16 back into its socket out of engagement with the slide which it is desired to shift. The mechanism within the base of the casing 10 so far described is old and well known and forms no part of my invention except in so far as the locking means hereinafter described coöperates with this mechanism.

In the embodiment of my invention illustrated, I have shown the gear shift lever 15 as swingingly mounted within its bracket 10 by a pair of trunnions extending at right angles to each other. The pivotal means for the lever 15 herein disclosed consists of a pivot pin 17, which passes through a relatively large ringlike portion 18 with which the gear shift lever is provided, and the opposite ends of this pin 17 are rotatably mounted in bearings 19 formed within the upper portion of the casing 10. The ring 18 of the gear shift lever is pivotally secured to the pin 17 by the pointed screws 20 threaded in the opposite sides of the ring 18 and having their pointed inner ends inserted in correspondingly shaped sockets formed in the opposite sides of the pin 17, the arrangement being such that the lever 15 is free to rock in one plane upon the pivot screws 20 and is free to rock in a second plane at right angles to the first by the rotation of the pin 17 within its bearings 19. The upper portion of the gear shift lever 15 preferably consists of a hollow tube 21 upon the upper end of which is mounted a knob (not shown) adapted to be grasped by the hand to operate this lever.

The locking means which I have provided for the type of lever herein described consists of a bolt 22 slidably mounted within the gear shift lever, and the lower end of this bolt is provided with a flattened head 23 having a notch 24 formed in the lower face thereof. This flattened head is constructed to be slidably mounted in a slot 25 formed in the lower end of the gear shift lever 15, as shown more particularly in Fig. 4. The sliding bolt 22 preferably extends upwardly within the gear shift lever through the ring 18 and through a relatively large opening 26 formed through the pivot pin 17, and the upper end of this bolt is preferably rigidly secured to a cylinder-shaped block 27 in the upper end of which is formed a threaded socket 28, the threads preferably being coarse and are adapted to receive the correspondingly threaded end of an operating rod 29. The rod 29 is rotatably mounted within the tubular member 21 and is preferably constructed to be rotated by any preferred form of key-controlled means, (not shown). Since in the embodiment of my invention shown, the upper portion of the gear shift lever 15 is bent, I have shown the upper and lower portions of the rotating rod 29 coupled together by a universal joint 30.

There is mounted at the upper end of the lever 21 the usual knob 31, which contains a lock 32 of ordinary construction which has a key barrel 33 to which is connected the upper end of the rod 29. The key barrel may be provided with wings 34 which will enable it to be turned by the fingers from its unlocked to its locked position.

From the above description, when read in connection with the drawings, it will be seen that my gear shift lever 15 may readily be locked in its neutral position by simply moving the same to this position so that the lower end of this lever will lie directly above the guide rod 11, whereupon the threaded rod 29 may be rotated by the key-controlled mechanism, so that the threads upon the lower end of this rod will force the bolt 22 downward to cause the notch 24 formed in the lower end of the same to move into engagement with the rod 11, as shown in Fig. 4. Whereupon the gear shift lever 15 will be prevented from being shifted in a lateral direction, and since, as above pointed out, the slides 12 and 13 cannot be shifted out of the neutral position, in which they are shown in Fig. 4, until the gear shift lever has been shifted laterally sufficiently to force one of the pins 16 out of the slot 14, it will be seen that this mechanism satisfactorily locks the gear shift lever in its neutral position. When it is desired to unlock my gear shift lever, all that is necessary is to rotate the threaded pin 29 in the opposite direction to thereby retract the bolt 29, so that the lower end of the same will clear the guide rod 11. Although the gear shift lever 15 is swingingly mounted upon the pivot pin 17 by the threaded screws 20, this rocking movement of the lever does not interfere with the proper operation of the bolt 22, since the clearance opening 26 formed through the pivot pin is sufficiently large to at all times clear the upper portion of the bolt 22.

It will be apparent that various minor changes may be made in the device herein disclosed without departing from the spirit of my invention as defined in the annexed claims.

I do not claim, broadly, herein a lever supported in a bracket by means of trunnions extending at right angles to each other and means to block the swinging of said lever upon one pair of its supporting trunnions; nor do I claim herein a lever support swingingly mounted upon a supporting bracket, a lever swingingly mounted upon said support and key controlled means to lock said lever against movement as claimed in my copending application, Serial No. 341,618, filed December 1st, 1919. Neither do I claim in this application a supporting bracket, means for swingingly mounting a lever upon said bracket, including a pivot pin movable with said lever and means for locking said pin against movement, as claimed in my copending renewal application, Serial No. 414,143, renewed October 1st, 1920.

What I claim is:

1. In gear shifting mechanism including a supporting bracket having a gear shift lever swingingly mounted therein, gear positioning slides operated by said lever, and a rod within said bracket having said slides movably mounted thereupon; means for locking said lever in its neutral position, comprising a notched bolt carried by the lower end of said lever, and a key controlled lock for moving the notch of said bolt into locking engagement with said rod.

2. In combination, a supporting bracket having a gear shift lever swingingly mounted therein, gear positioning slides operated by said lever, a guide within said bracket having said slides movably mounted thereupon, and means for locking said lever in its neutral position, comprising key controlled means carried by said lever and movable into and out of engagement with said guide.

3. In combination, a supporting bracket having a gear shift lever swingingly mounted therein, gear positioning slides operated by said lever, a guide within said bracket having said slides movably mounted thereupon, and means for locking said lever in its neutral position, comprising a key controlled bolt slidably mounted within said lever, said bolt having a notch formed therein and positioned to be moved into straddling engagement with said guide.

4. In combination, a supporting bracket having a pair of gear positioning slides therein, a guide operatively supporting said slides, means for normally retaining said slides in their neutral position, a gear shift lever for releasing said means and shifting said slides, and locking means carried by said lever and movable into engagement with said guide to prevent the shifting of said lever a sufficient distance to release said first mentioned means.

5. In combination, a supporting bracket having a pair of gear positioning slides therein, a guide operatively supporting said slides, means for normally retaining said slides in their neutral position, a gear shift lever for releasing said means and shifting said slides, and locking means carried by said lever and movable into straddling engagement with said guide to prevent the shifting of said lever a sufficient distance to release said first mentioned means.

6. In combination with a gear shift lever, a supporting bracket, means for swingingly mounting said lever within said bracket including trunnions extending at right angles to each other, and locking means for said lever positioned at the lower end of said lever, said locking means operated by a rod extending longitudinally within said lever and between said trunnions.

7. In combination with a gear shift lever, a supporting bracket, a pivot pin supporting said lever for universal movement extending through said lever into engagement with said bracket, and locking means for said lever operatively mounted at the lower end of said lever, said locking means controlled by a rod extending longitudinally of said lever through said pivot pin.

In witness whereof, I have hereunto set my hand on the 15th day of December, 1919.

JOHN H. SHAW.